(12) United States Patent
Garrigues et al.

(10) Patent No.: US 12,262,218 B2
(45) Date of Patent: Mar. 25, 2025

(54) SYSTEM FOR ASSISTING THE ORIENTATION OF AN ANTENNA OF A BEACON WITH REGARD TO A TARGET POSITION

(71) Applicant: APITRAK SAS, Meylan (FR)

(72) Inventors: Eulalie Garrigues, Blagnac (FR); Luc Antolinos, Blagnac (FR)

(73) Assignee: APITRAK SAS, Meylan (FR)

( * ) Notice: Subject to any disclaimer, the term of this patent is extended or adjusted under 35 U.S.C. 154(b) by 466 days.

(21) Appl. No.: 17/763,098

(22) PCT Filed: Sep. 29, 2020

(86) PCT No.: PCT/FR2020/051705
§ 371 (c)(1),
(2) Date: Mar. 23, 2022

(87) PCT Pub. No.: WO2021/064321
PCT Pub. Date: Apr. 8, 2021

(65) Prior Publication Data
US 2022/0393779 A1  Dec. 8, 2022

(30) Foreign Application Priority Data

Sep. 30, 2019  (FR) ...................................... 1910809

(51) Int. Cl.
*G01S 1/02* (2010.01)
*G01S 1/04* (2006.01)
(Continued)

(52) U.S. Cl.
CPC ............. *H04W 16/18* (2013.01); *G01S 1/024* (2013.01); *G01S 1/047* (2013.01); *H04B 7/0617* (2013.01);
(Continued)

(58) Field of Classification Search
CPC ......... G01S 1/02–82; G01S 5/0009–30; G01S 7/003–64; G01S 11/02–16;
(Continued)

(56) References Cited

U.S. PATENT DOCUMENTS

2013/0194077 A1\* 8/2013 Vargas ............... G06Q 10/0875
2014/0205205 A1\* 7/2014 Neubauer .............. H01Q 1/125
(Continued)

FOREIGN PATENT DOCUMENTS

CA  2 989 258 A1  1/2017
EP  1 065 629 A2  1/2001
(Continued)

OTHER PUBLICATIONS

International Search Report as issued in International Patent Application No. PCT/FR2020/051705, dated Dec. 23, 2020.

*Primary Examiner* — Timothy J Weidner
(74) *Attorney, Agent, or Firm* — Pillsbury Winthrop Shaw Pittman LLP

(57) ABSTRACT

A system for assisting the positioning, in particular the orientation, with regard to a target position, of an antenna of a beacon intended to be in communication link by radio signal with a transmitter/receiver device, the system including a system for representation of a lobe of the radiation pattern of the antenna of the beacon on a projection surface of an environment in which said beacon is intended to be installed, and a system for measuring a distance separating the beacon and at least one point on the projection surface corresponding to the target position or positions.

17 Claims, 1 Drawing Sheet

(51) Int. Cl.
- *G01S 13/75* (2006.01)
- *G01S 13/89* (2006.01)
- *H04B 7/06* (2006.01)
- *H04B 17/23* (2015.01)
- *H04B 17/27* (2015.01)
- *H04W 4/029* (2018.01)
- *H04W 16/18* (2009.01)
- *H04W 24/02* (2009.01)
- *H04W 64/00* (2009.01)

(52) U.S. Cl.
CPC ............ *H04B 17/23* (2015.01); *H04B 17/27* (2015.01); *H04W 4/029* (2018.02); *H04W 24/02* (2013.01); *H04W 64/00* (2013.01); *H04W 64/003* (2013.01); *G01S 13/75* (2013.01); *G01S 13/895* (2019.05)

(58) Field of Classification Search
CPC .. G01S 13/003–958; G01S 17/003–95; G06K 7/10009–10475; G06Q 10/08–0875; H01Q 1/002–528; H04B 7/02–12; H04B 17/0082–3913; H04L 41/14–26; H04W 4/02–80; H04W 16/02–32; H04W 24/02–10; H04W 40/005–38; H04W 64/00–006; H04W 88/18–188
See application file for complete search history.

(56) References Cited

U.S. PATENT DOCUMENTS

| | | |
|---|---|---|
| 2017/0374330 A1 | 12/2017 | Okazaki |
| 2018/0189971 A1 | 7/2018 | Hildreth |
| 2019/0190626 A1* | 6/2019 | Kikuma ................. H04B 17/23 |

FOREIGN PATENT DOCUMENTS

| | | |
|---|---|---|
| EP | 3 316 680 A1 | 5/2018 |
| WO | WO 2015/051855 A1 | 4/2015 |
| WO | WO 2017/001538 A1 | 1/2017 |

* cited by examiner

[Fig. 1]
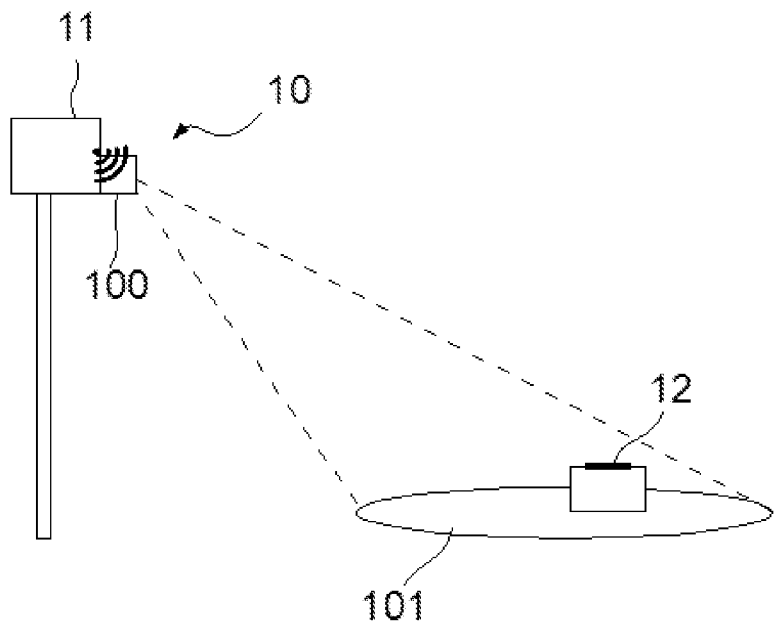
[Fig. 2]
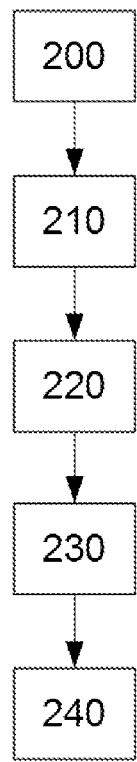

SYSTEM FOR ASSISTING THE ORIENTATION OF AN ANTENNA OF A BEACON WITH REGARD TO A TARGET POSITION

CROSS-REFERENCE TO RELATED APPLICATIONS

This application is the U.S. National Stage of PCT/FR2020/051705, filed Sep. 29, 2020, which in turn claims priority to French patent application number 1910809 filed Sep. 30, 2019. The content of these applications are incorporated herein by reference in their entireties.

TECHNICAL FIELD OF THE INVENTION

The present invention belongs to the field of installation of equipment of a wireless communication system. More particularly, the invention relates to a system for assisting in orienting an antenna of infrastructure equipment of the wireless communication system, referred to here as a "beacon", comprising an antenna for, depending on the equipment, either transmitting or receiving a radio signal, with respect to a zone of interest in which a device transmitting to said beacon or receiving from said beacon (referred to here as a "transceiver device") is likely to be positioned.

PRIOR ART

The present invention finds a particularly advantageous application, although by no means limiting, in wireless communication-based geolocation systems. In such a system, the object to be located, referred to here as a "tag", is for being in communication link with one or more beacons.

The tag may, for example, be stuck on an object in an industrial zone (for example a package or equipment stored in a warehouse). For example, the tag includes an integrated circuit and an antenna to transmit a radio signal to the beacon, or to receive a radio signal from the beacon, appropriately positioned in said industrial zone to receive or transmit said radio signal. When the radio signal is transmitted by the tag to the beacon, it carries, for example, a message corresponding to an identifier of the tag. When the radio signal is transmitted by the beacon to the tag, it carries, for example, an encoded message and/or is used as a radio wave remote power source whose energy is collected by the tag.

When installed in the industrial zone, the tag is generally suitably oriented so that its antenna transmits or receives a radio signal for optimal communication between the tag and the beacon.

To ensure suitable orientation, the operators responsible for placing the beacon especially take account of the path of the radio signal to or from the beacon so that the tags fall within an optimal zone in the radiation pattern of the antenna of the beacon in which there is sufficient signal power to establish communication, as the signals travel up and/or down between the beacon and the tag.

Currently, there is no reliable tool to assist in this operation of orienting the beacon and the operator is therefore generally forced to orient said beacon with the help of qualified personnel estimating the correspondence between the range of the antenna of the beacon and a location that the tag is likely to occupy. Further, the orientation of the beacon has to be necessarily validated by said qualified experts.

It should be noted that the tags are generally installed at a height, typically several meters above the ground. Access to them therefore requires imposing lifting equipment, for example a lift basket, which dictates the use of a qualified operator to handle it and an operator on the ground to guide it. This implies the immobilization of two people and the ground surface necessary for the installation of said basket.

In addition to the accessibility restrictions of the beacon, there are also accessibility restrictions of the premise in which it is installed. Indeed, the installation of the beacons is carried out when the industrial zone is relatively uncluttered and when the premises are accessible, which is not necessarily the case thereafter, for example if it is necessary to correct the orientation of the beacon. More precisely, the site can later be occupied by production means, storage means, conveyor chains, etc. Access to the beacon may therefore be highly constrained (access during regulated hours, outside of working hours, etc.), or even impossible.

When it is not possible for an operator to return to the site to adjust the direction of said beacon, this generates an additional cost and a significant loss of time.

DISCLOSURE OF THE INVENTION

The purpose of the present invention is to overcome the above-mentioned drawbacks by providing a system for assisting in positioning, especially orienting an antenna of the beacon with respect to a target position in which a transceiver device is likely to be positioned.

In other words, the present invention relates to a system for positioning, and especially orienting, a beacon so as to allow optimal communication between said beacon and a transceiver device.

Another purpose of the present invention is to provide an inexpensive solution.

To this end, the invention relates to a system for assisting in positioning, especially orienting, with respect to a target position, an antenna of a beacon for being in radio signal communication link with a transceiver device.

The system includes:
means for representing at least one lobe of the radiation pattern of the antenna of the beacon on a projection surface of an environment in which said beacon is for being installed, said representation means generating a graphic representation of a shape substantially corresponding to the projection of the lobe onto the projection surface,
means for measuring a distance separating the beacon and at least one point on the projection surface corresponding to a target position, for example located in the extension of a longitudinal axis of the lobe.

The measuring means advantageously allow the comparison of the distance separating the antenna of the beacon and a target position, and the reception range of a signal from the antenna of the beacon, so as to know whether or not a target position is within the range of the antenna of the beacon.

The assistance in orienting the antenna of the beacon provided by the system according to the invention ensures optimal positioning of said beacon with respect to a target position.

Furthermore, this characteristic also makes it possible to guarantee to an operator the correct orientation of the beacon relative to a target position once said beacon has been installed, insofar as the operator can make sure of the correspondence between a predetermined value of the distance between the beacon and a target position and the measured value of this same distance.

The present invention thus constitutes an effective tool for controlling an installation of a beacon.

In particular embodiments, the invention further satisfies the following characteristics, implemented separately or in each of their technically operative combinations.

In particular embodiments of the invention, the representation means include a laser configured to generate a beam whose projection onto the projection surface has a shape substantially corresponding to the projection of the lobe onto the projection surface.

In particular embodiments of the invention, the representation means include a viewing device coupled to a camera for filming the projection surface, the viewing device including a graphic representation marking a projection of the lobe superimposed on the projection surface represented on said device.

In particular embodiments of the invention, the representation means of the antenna lobe of the beacon include a video projector configured to project onto the projection surface of the environment a graphic representation of a shape substantially corresponding to the projection of the lobe onto the projection surface.

In particular embodiments of the invention, the means for measuring a distance separating the beacon and the projection surface include a range finder.

In particular embodiments of the invention, the means for measuring a distance separating the beacon and the projection surface include a time-of-flight camera connected to a viewing device configured to display a graphic representation substantially corresponding to the projection of the lobe onto the projection surface, said time-of-flight camera being configured to be fixed to the beacon so as to allow viewing on the viewing device, for each pixel of the camera sensor, of a distance measured between the camera and the projection surface.

In particular embodiments of the invention, the viewing device includes an interaction device and is configured to drive the representation means so that they project a pattern onto the projection surface at a position corresponding to the position of at least one point selected by an operator on the projection surface represented on said viewing device.

In particular embodiments of the invention, the representation means and the measurement means are configured to represent different zones corresponding to different exchange quality levels of a radio signal between the transceiver device and the antenna of the beacon, said quality levels being defined as a function of different distance ranges from the beacon, and/or of the representation of different radiation lobes.

In particular embodiments of the invention, the representation means are configured to represent zones having different exchange quality levels of a radio signal between the transceiver device and the antenna of the beacon, taking account of intrinsic parameters of the transceiver device, especially its sensitivity and/or environmental factors that may disturb the signal, such as the presence of flows of objects or people, and/or the presence of objects emitting an electromagnetic field.

In particular embodiments of the invention, the representation means are configured so as to generate a graphic representation capable of giving an indication relating to the polarity of the antenna of the beacon.

In particular embodiments of the invention, the system comprises means for measuring the position and orientation in space of the antenna of the beacon.

According to another aspect of the present invention, a method for installing a beacon using the system as previously described includes:

a step of representing a lobe of the radiation pattern of the antenna of the beacon by the representation means, a step of measuring the distance between the beacon and at least one point of the projection surface corresponding to a target position, a step of adjusting the orientation of the beacon if the value of the measured distance is greater than a predetermined value of the reception range of a signal from the antenna of said beacon, so that the measured distance is less than the value of said range, or if the point is not located in the zone corresponding to the projection of the lobe onto the projection surface.

In particular modes of implementation, the method comprises a step of acquiring data relating to the position and/or orientation in space of the antenna of the beacon.

In particular modes of implementation, the method further comprises a step of transmitting information specific to the orientation adjustment of the beacon, to a recording device.

In particular modes of implementation, the method further includes a preliminary test step in which:

the representation means project onto a projection surface a pattern corresponding to an operator's selection of at least one point on a monitor displaying the projection surface, the transceiver device is placed in place of the pattern on the projection surface, the power of the signal exchanged between the beacon and the transceiver device is measured upon transmitting and receiving and these data are compared.

The quality of the signal transmission, and therefore the quality of the communication, can thus be determined.

BRIEF DESCRIPTION OF THE FIGURES

The invention will be better understood upon reading the following description, given by way of non limiting example, and made with reference to the figures which represent:

FIG. 1 schematically a system for assisting in orienting the antenna of a beacon, with respect to a target position, comprising means for representing the radiation lobe of the antenna of the beacon according to a first alternative embodiment;

FIG. 2 a logic diagram of a method for installing a beacon using an orientation assistance system according to FIG. 1.

In these figures, reference numerals that are identical from one figure to another designate identical or similar elements. Also, for clarity, the drawings are not to scale unless otherwise noted.

DESCRIPTION OF EMBODIMENTS

The system 10 according to the invention provides a visual marker or markers to assist an operator in installing a beacon 11 for establishing a radio signal communication link with a transceiver device 12.

More specifically, the purpose of the system 10 is to provide assistance for positioning, especially for orienting, an antenna of the beacon 11 with respect to a predetermined zone of interest in the environment, referred to hereinafter as a "target position", in which a transceiver device 12 is likely to be positioned.

The transceiver device 12 includes, for example, an electronic chip, an antenna, and a battery that is recharged from the energy coming from surrounding electromagnetic fields, to transmit a radio signal to a beacon 11. In particular embodiments, the electromagnetic fields to recharge the tag battery are generated by a beacon.

In a preferred application of the present invention, the beacon 11 is for being installed on a support structure within an open or closed environment, such as an industrial building, for example, a warehouse or storage shed, a factory, etc., in which a transceiver device 12 is to be placed.

The beacon 11 may include wireless communication means, considered known to the person skilled in the art, enabling the beacon 11 to receive radio signals in order to receive a message from the transceiver device 12 also in the form of radio signals.

In particular embodiments, the beacon 11 may additionally or alternatively include an electromagnetic energy source for generating electromagnetic fields to the transceiver device 12.

The antenna of the beacon 11 has a specific radiation pattern representative of the angular distribution in space of the radiofrequency radiation from the antenna. It should be noted that, in a manner known to the person skilled in the art, the radiation pattern is also the reception pattern of the antenna.

Advantageously, the system 10 includes means for representing 100 at least one lobe for transceiving a radiation pattern of the antenna of the beacon 11 in the environment in which said beacon 11 is for being installed. The lobe represents a radiofrequency radiation and/or reception zone of the antenna of the beacon 11.

Such a characteristic allows an operator, when installing the beacon 11, to view a graphic representation of a shape substantially corresponding to the projection of the antenna lobe of the beacon 11 in the environment, and thus to identify the radiation coverage of the signal it may receive or transmit, relative to said environment.

The operator can thus appropriately orient the beacon 11 so that the lobe corresponds to a target position likely to be occupied by a transceiver device 12.

The representation means 100 are configured according to intrinsic parameters of the antenna of the beacon 11 so that the shape of the graphic representation they emit substantially corresponds to that of the projection of a antenna lobe of said beacon 11.

To this end, the representation means 100 may include a calculator, for example of the microprocessor type, connected to a database in which are stored representation models of the radiation pattern corresponding to that of the antenna of the beacon 11 to be installed.

Alternatively, the intrinsic parameters of the antenna of the beacon 11 can be automatically identified by the representation means 100, for example when they are fixed to the beacon 11, by virtue of a communication medium comprising data representative of these parameters, such as an NFC (Near Field Communication) sensor, a bar code, or any other communication means attached to said beacon 11.

In other words, when the representation means are fixed to the beacon 11, they acquire the characteristics of the antenna of said beacon 11 and based on this information can adapt the model of the graphic representation that they are intended to emit.

The target position(s) are predetermined and can be marked in the environment by a graphic marker (not represented in FIG. 1), an object or any other identification means.

In a first alternative embodiment represented in FIG. 1, the representation means 100 include a laser configured according to the characteristics of the radiation pattern so that its beam has a shape substantially corresponding to the shape of the lobe. For example, the laser beam is cone-shaped.

The laser is for being fixed, preferably removably, to the beacon 11 so that its beam is projected against a surface of the environment called the "projection surface". The laser is preferably fixed to the beacon 11 as close as possible to the center of the radiation pattern, that is, the center of the antenna, and emits its beam in a direction parallel to that along which the longitudinal axis of the lobe extends (not represented in FIG. 1).

In an exemplary embodiment of the invention, the laser beam may be projected through a perforated mask, known to the person skilled in the art as a "gobo", which forms the beam to a predefined shape so that its projection onto the projection surface substantially corresponds to the projection of the antenna lobe of the beacon 11.

In another example, especially if the shape of the antenna lobe is complex, the laser may include a set of movable mirrors for continuously deflecting the laser beam so that the shape of the projection resulting from the beam scanning substantially corresponds to the projection of the antenna lobe of the beacon 11. Alternatively, the laser may be movable and continuously oriented so that its beam is projected in a shape corresponding to the projection of the antenna lobe of the beacon 11. In these latter two exemplary embodiments, the laser may emit its beam discontinuously as it travels in order to model disjointed zones of the projection of the antenna lobe of the beacon 11.

Further, the representation means 100 may include a plurality of lasers.

The projection surface may be the ground, as illustrated in FIG. 1, and/or any object in the environment, such as a structure element of the building.

The reflection of the laser beam on the projection surface results in a graphic representation 101 of a shape substantially corresponding to the projection of the lobe onto the projection surface.

The graphic representation is determined by the calculator, according to a representation model of the radiation pattern corresponding to that of the antenna of the beacon 11 to be installed selected from the database.

By virtue of the graphic representation 101 projected onto the projection surface, the operator can orient the beacon 11 to cover a target position by the lobe.

In a second alternative embodiment (not represented in the figures), the representation means 100 may comprise a viewing device, such as a monitor, coupled to a camera.

In this alternative embodiment, the camera is for being fixed, preferably removably, to the beacon 11 so as to be as close as possible to the center of the radiation pattern, and so as to be oriented in a direction parallel to the longitudinal axis of the lobe.

Further, the monitor includes a fixed graphic representation marking a projection of the lobe onto a projection surface. The graphic representation is superimposed, on the monitor, on the projection surface filmed by the cam era.

The graphic representation is virtually projected onto a projection surface of the environment filmed by the camera. On the monitor, the graphic representation is, for example, substantially in the shape of a circle.

Thus, the movement of the beacon 11 causes the projection surface opposite the camera to move on the monitor relative to the circle representing the lobe and allows an operator to quickly and easily adequately position the beacon 11 so that the target position(s) is inscribed into the projection of the lobe represented on the monitor.

Thus, it is easy for the operator to position the beacon 11 with the assistance of the monitor so that the target position is within the antenna lobe of the beacon 11.

In a third alternative embodiment (not represented in the figures), the representation means 100 may include a video projector configured to project onto a projection surface of the environment a graphic representation representative of the antenna lobe of the beacon 11.

Similar to the alternative embodiments described above, the movement of the beacon 11 causes the projected image (s) to move relative to the projection surface and allows an operator to quickly and easily adequately position the beacon 11 so that the target position(s) is inscribed in the projection of the lobe represented by the projected image(s).

Advantageously, the representation means may be configured such that the graphic representation provides an indication relating to the polarity of the antenna of the beacon 11.

More particularly, the graphic representation may have particular patterns according to the polarity of the antenna, such as hatching whose direction varies according to the polarity of the antenna. The graphic may also or alternatively have a color that varies with the polarity of the antenna.

Thus an operator can easily view if the antenna of the beacon 11 is improperly oriented and correct this misorientation.

Advantageously, the system 10 includes means for measuring a distance separating the beacon 11 and at least one point on the projection surface corresponding especially to the target position(s).

This characteristic advantageously makes it possible, knowing the reception range of a signal from the antenna of the beacon 11, to know whether or not the target position(s) is within said range of the antenna of the beacon 11. Indeed, in some cases, the lobe representation projected onto the projection surface may extend over a distance greater than the actual range of the antenna of the beacon 11.

Furthermore, this characteristic also makes it possible to guarantee to an operator the correct orientation of the beacon 11 relative to the target position(s) once said beacon 11 is installed, insofar as he can make sure the correspondence between a predetermined value of the distance between the beacon 11 and the target position(s) and the measured value of this same distance.

The means for measuring the distance separating the beacon 11 and the external environment may be formed by a range finder, for example, for being fixed to the beacon 11.

In an alternative of the measuring means, the latter may be formed by a time-of-flight camera, known by the person skilled in the art under the acronym "TOF", connected to a monitor. The monitor is configured to display a graphic representation marking the periphery of the lobe. As such, this alternative embodiment may advantageously be combined with the second alternative embodiment of the representation means 100 described above.

Alternatively, this alternative embodiment of the measurement means may be combined with the other alternative embodiments of the representation means 100.

The time-of-flight camera is preferably for being fixed to the beacon 11 so as to be substantially adjacent to the center of the radiation pattern, and so as to be oriented along a direction parallel to the longitudinal axis of the lobe.

The time-of-flight camera makes it possible to represent on the monitor, for each pixel of the camera sensor, a distance measured between the camera, and thus the beacon 11, and the environment in front of said beacon 11 filmed by the camera. On the monitor, the operator can thus view the projection of the lobe and have an indication relating to the distance of each point, marked by pixels, of this zone.

One of the advantages of this characteristic lies in the fact that the distance measurement is performed relative to a surface and not relative to a point.

Advantageously, in a preferred exemplary embodiment of the invention, the representation means 100 are associated with the measurement means and are configured to represent different zones corresponding to different exchange quality levels of a radio signal between the transceiver device 12 and the antenna of the beacon 11, that is, to different quality levels of a radio communication link between the transceiver device 12 and the antenna of the beacon 11. The quality levels are defined as a function of different distance ranges from the beacon 11, and/or representation of different radiation lobes.

It should be noted that the greater the distance between the beacon 11 and the transceiver device, the more the power of the signal transmitted by the transceiver device 12 is attenuated during its propagation. The reception power of the signal from the antenna of the beacon 11 thus changes as a function of the distance separating it from the transceiver device 12.

By virtue of this characteristic, the system 10, by identifying several exchange quality levels of a radio signal between the transceiver device 12 and the antenna of the beacon 11, makes it possible to determine one or more optimal reception zones for said beacon 11.

For example, the representation means 100 may be configured to project onto a projection surface graphic representations each having a shape substantially corresponding to the projection onto the projection surface of each of the lobes of the radiation pattern of the antenna of the beacon 11, that is, the projection onto the projection surface of each of the side lobes and that of the main lobe (not shown in the figures).

Thus, because the operator can view the signal reception coverage of the antenna of the beacon 11 during installation, the operator's operating range to appropriately orient the beacon 11 to have one of the antenna lobes of said beacon 11 correspond to the target position(s) is increased.

For example, according to the alternative embodiment of the representation means 100 under consideration, the system 10 may include several lasers, cameras, and/or video projectors configured so that the shape of the graphic representations they project substantially correspond to the projection onto the projection surface of the antenna lobes of the beacon 11, respectively.

In examples in which the representation means 100 include a laser or lasers whose beam is movably driven, the distance measurement may be scanned simultaneously with the movement of said beam. It is also contemplated that the beam of the laser(s) may change color based on a predetermined maximum distance.

In an embodiment, the distance information may also be fed back to a third party device, for example for representation on a viewing device and/or for storage.

Alternatively or additionally, the representation means 100 may, for one or each lobe, project onto a projection surface a set of graphic representations of, for example, concentric shapes, each of which being representative of different reception power levels of a signal of the antenna of the beacon 11 that may correspond to different distance ranges from the beacon and/or different radiation lobes of the antenna of the beacon 11.

Each of these concentric shapes can be represented differently according to predetermined distance ranges between the measuring means and the environment being filmed representative of exchange quality levels of a radio signal between the transceiver device 12 and the antenna of the beacon 11.

In an alternative embodiment, the representation means 100 may be associated with measurement means.

For example, the representation means 100 may be associated with a time-of-flight camera as previously described connected to a monitor. The time-of-flight camera and monitor may be configured to allow viewing of the environment located in the direction of the longitudinal axis of the or each antenna lobe of the beacon 11.

Advantageously, the time-of-flight camera and/or monitor is configured such that the visual appearance of each pixel on the image is a function of the distance at which the environment being filmed is positioned relative to the time-of-flight camera.

More particularly, the color of each pixel represented on the monitor is dependent on the value of the distance between the time-of-flight camera and the environment being filmed. For example, the color of each pixel may change according to predetermined distance thresholds representative of the exchange quality level of a signal between the transceiver device 12 and the antenna of the beacon 11. Thus, different colors may define distances representative of a reception quality level of the antenna of the beacon 11.

In another preferred alternative embodiment of the invention, the representation means 100 are configured to represent different exchange quality levels of a signal between the transceiver device 12 and the antenna of the beacon 11, taking account of intrinsic parameters of the transceiver device 12, especially its sensitivity.

The more sensitive a transceiver device 12, the more a communication link can be established with the beacon 11 in response to a low-strength signal. Conversely, a transceiver device 12 with low sensitivity requires a higher-strength signal to establish a communication link.

Since the representation means 100 are capable of determining and representing an optimal reception zone or zones depending on the sensitivity of the transceiver device 12, an operator may therefore consider a wider orientation range of the beacon 11 depending on the characteristics of the transceiver device or devices 12 for communicating with the beacon 11.

Alternatively or additionally, the representation means 100 are configured to represent different exchange quality levels of a signal between the transceiver device 12 and the antenna of the beacon 11, taking account of environmental factors that may disturb the signal, such as the presence of a flow of objects or people or the presence of objects emitting an electromagnetic field.

Preferably, in order to enable testing of the communication link between the beacon 11 and a transceiver device 12, the monitor may be connected to the time-of-flight camera and include an interaction device, such as a touch interaction surface. The monitor is configured to drive the representation means 100 so that they respond to the operator's selection of at least one point on the projection surface represented on said monitor by projecting a pattern at a position on the projection surface corresponding to the selected point on the monitor.

This pattern advantageously forms a marker of a test position of a transceiver device 12. Once the transceiver device 12 is placed at the test position, the operator can measure the power of a signal transmitted (or received) by the transceiver device 12 and compare it to the power of the signal received (or transmitted) by the antenna of the beacon 11.

This characteristic is to make sure that the communication link is correctly established between the beacon 11 and the transceiver device 12 and possibly to determine whether the position of the transceiver device 12 is adapted, especially with respect to its sensitivity, and/or whether the signal transmission from the transceiver device 12 is not disturbed by an environmental factor, such as metal objects located in the vicinity of the transceiver device 12 or devices emitting strong magnetic fields.

The representation means 100 may be configured to project an indicator of the test result. For example, the color and/or shape of the pattern may be changed depending on whether or not the communication link is properly established between the beacon 11 and the transceiver device 12.

Furthermore, the system 10 includes means for measuring the position and/or orientation in space of the antenna of the beacon 11. These means may allow the absolute position of the antenna of the beacon 11 to be determined, for example in the form of coordinates inscribed in a Cartesian reference frame. Alternatively, these means may allow the relative position of the antenna of the beacon 11 to be determined with respect to elements of the environment in which said beacon 11 is installed, that is the distance between the antenna and said elements. These elements can be infrastructures or objects, such as walls, posts, machines, etc. These means may comprise one or more position sensors as such within the reach of the person skilled in the art.

Alternatively or additionally, these means allow the inclination of the antenna of the beacon 11 to be determined, that is the inclination of the longitudinal axis of its lobe, for example with respect to three orthogonal axes. These means may comprise a gyroscope or any other sensor as such within the reach of the person skilled in the art.

Advantageously, these characteristics make it possible to verify and confirm compliance of the installation of the antenna of the beacon 11 by comparison of the positioning and/or orientation data determined according to predefined theoretical data.

These characteristics can also be used subsequently in calculations implemented in methods known as "Time Difference Of Arrival" (TDOA) known as such to the person skilled in the art.

Further, in order to install the beacon 11 fixedly against, for example, a fixed structure of the building and to ensure that it is maintained in a position in space and in an optimal orientation, the beacon 11 comprises fixing means configured to occupy a state in which they allow its mobility and a state in which they immobilize it.

The present invention also relates to a method for installing a beacon 11 using the system 10, the steps of which, for example successive steps, are represented in FIG. 2.

The method includes a step of representing 200 a lobe of the radiation pattern of the antenna of the beacon 11 by the representation means 100, then a step of measuring 210 the distance extending between the beacon 11 and at least one point of the projection surface corresponding to the target position(s).

A step of adjusting the orientation 220 of the beacon 11 is performed if the point is not located in the zone corresponding to the projection of the lobe onto the projection surface or if the value of the measured distance is greater than a predetermined value of the reception range of a signal from the antenna of the beacon 11, so that the measured distance is smaller than the value of said range.

The method may include a step of acquiring data 230 relating to the position and/or orientation in space of the antenna of the beacon 11 by means for measuring the position and/or orientation in space of the antenna of the beacon 11, followed by a step of storing 240 such data.

The method may also include a step of transmitting information 240 specific to the orientation adjustment of the beacon 11, especially information relating to the measurement performed during the measurement step 210, data relating to a test, etc., to a recording device, such as a third-party server, etc.

This transmission step 240 can be performed by any known communication means, for example by radio wave, by cable, by removable internal memory transferable after the orientation adjustment step 220, etc.

Depending on the type of communication means contemplated, this information transmission step 240 may be performed in real time or following the installation of a plurality of beacons 11.

Keeping this information with the recording device allows particular configurations to be identified or determined for optimizing future installations.

More generally, it should be noted that the implementations and embodiments of the invention considered above have been described as non-limiting examples and that other alternatives are therefore contemplatable.

The invention claimed is:

1. A system for assisting in positioning, with respect to a target position, an antenna of a beacon for being in radio signal communication link with a transceiver device, said system comprising:
   representation means for representing at least one lobe of a radiation pattern of the antenna of the beacon on a projection surface of an environment in which said beacon is for being installed, said representation means generating a graphic representation of a shape substantially corresponding to a projection of the lobe onto the projection surface, and
   measurement means for measuring a distance separating the beacon and at least one point on the projection surface corresponding to the target position.

2. The system according to claim 1, wherein the representation means include a laser configured to generate a beam whose projection onto the projection surface has a shape substantially corresponding to the projection of the lobe onto the projection surface.

3. The system according to claim 1, wherein the representation means include a viewing device coupled to a camera for filming the projection surface, the viewing device including a graphic representation marking a projection of the lobe superimposed on the projection surface represented on said device.

4. The system according to claim 3, wherein the representation means include a video projector configured to project onto the projection surface of the environment a graphic representation of a shape substantially corresponding to the projection of the lobe onto the projection surface.

5. The system according to claim 1, wherein the measurement means for measuring a distance separating the beacon and the projection surface include a range finder.

6. The system according to claim 1, wherein the measurement means for measuring a distance separating the beacon and the projection surface include a time-of-flight camera connected to a viewing device configured to display a graphic representation of a shape substantially corresponding to the projection of the lobe onto the projection surface, said time-of-flight camera being configured to be fixed to the beacon so as to allow viewing on the viewing device, for each pixel of a sensor of the time-of-flight camera, of a distance measured between the time-of-flight camera and the projection surface.

7. The system according to claim 6, wherein the viewing device includes an interaction device and is configured to drive the representation means so that the representation means projects a pattern onto the projection surface at a position corresponding to the position of at least one point selected by an operator on the projection surface represented on said viewing device.

8. The system according to claim 1, wherein the representation means and the measurement means are configured to represent different zones corresponding to different exchange quality levels of a radio signal between the transceiver device and the antenna of the beacon, said quality levels being defined as a function of different distance ranges from the beacon, and/or of the representation of different radiation lobes.

9. The system according to claim 8, wherein the representation means are configured to represent zones having different exchange quality levels of a radio signal between the transceiver device and the antenna of the beacon taking account of intrinsic parameters of the transceiver device.

10. The system according to claim 9, wherein intrinsic parameters of the transceiver device include sensitivity and/or environmental factors that disturb the signal.

11. The system according to claim 1, wherein the representation means are configured to generate a graphic representation capable of giving an indication relating to the polarity of the antenna of the beacon.

12. The system according to claim 1, comprising means for measuring the position and orientation in space of the antenna of the beacon.

13. A method for installing a beacon using the system according to claim 1, the method comprising:
   a step of representing a lobe of the radiation pattern of the antenna of the beacon by the representation means,
   a step of measuring the distance extending between the beacon and at least one point of the projection surface corresponding to the target position,
   a step of adjusting an orientation of the beacon wherein a value of the measured distance is greater than a predetermined value of a reception range of a signal from the antenna of said beacon, so that the measured distance is less than the value of said range, or when the point is not located in a zone corresponding to the projection of the lobe onto the projection surface.

14. The method for installing a beacon according to claim 13, comprising a step of acquiring data relating to the position and/or orientation in space of the antenna of the beacon.

15. The method for installing a beacon according to claim 13, further comprising a step of transmitting information specific to the orientation adjustment of the beacon, to a recording device.

16. The method for installing a beacon according to claim 13, comprising a preliminary test step in which:
   the representation means project onto a projection surface a pattern corresponding to an operator's selection of at least one point on a monitor displaying the projection surface,
   the transceiver device is placed in place of the pattern on the projection surface
   a first power of the signal exchanged between the beacon and the transceiver device is measured upon transmitting and a second power of the signal exchanged between the beacon and the transceiver device is measured upon receiving and the first power and the second power are compared.

17. The system according to claim 1, wherein the positioning includes orienting the antenna.

* * * * *